United States Patent [19]

Gruich

[11] Patent Number: 4,629,241
[45] Date of Patent: Dec. 16, 1986

[54] ENERGY-SAVING AERODYNAMIC VEHICLE

[75] Inventor: Peter Gruich, Warren, Mich.

[73] Assignee: Irving M. Weiner, Southfield, Mich.; a part interest

[21] Appl. No.: 616,858

[22] Filed: Jun. 4, 1984

[51] Int. Cl.$^4$ ............................................. B62D 35/00
[52] U.S. Cl. ...................................................... 296/1 S
[58] Field of Search .................. 296/1 S, 91; D12/181

[56] References Cited

U.S. PATENT DOCUMENTS

| 3,797,879 | 3/1974 | Edwards | 296/1 S |
| 4,098,534 | 7/1978 | Wood | 296/1 S |
| 4,257,643 | 3/1981 | Choulet | 296/1 S |
| 4,313,635 | 2/1982 | Front | 296/1 S |

FOREIGN PATENT DOCUMENTS

| 893666 | 12/1981 | U.S.S.R. | 296/1 S |
| 885091 | 12/1981 | U.S.S.R. | 296/1 S |

Primary Examiner—Robert R. Song
Attorney, Agent, or Firm—Irving M. Weiner; Joseph P. Carrier; Pamela S. Burt

[57] ABSTRACT

Vehicle has wedge shaped frontal structure for urging the fluid through which it travels to pass solely along the vehicle side with minimal or zero turbulence. A visor on the structure further prevents the fluid contacting the front of the vehicle from flowing upwardly and across the vehicle's roof in turbulent fashion. The wedge may be placed above the driver enclosure, the forward vertical edge formed by the convergence of the wedge sides, being forwards of the driver enclosure.

10 Claims, 6 Drawing Figures

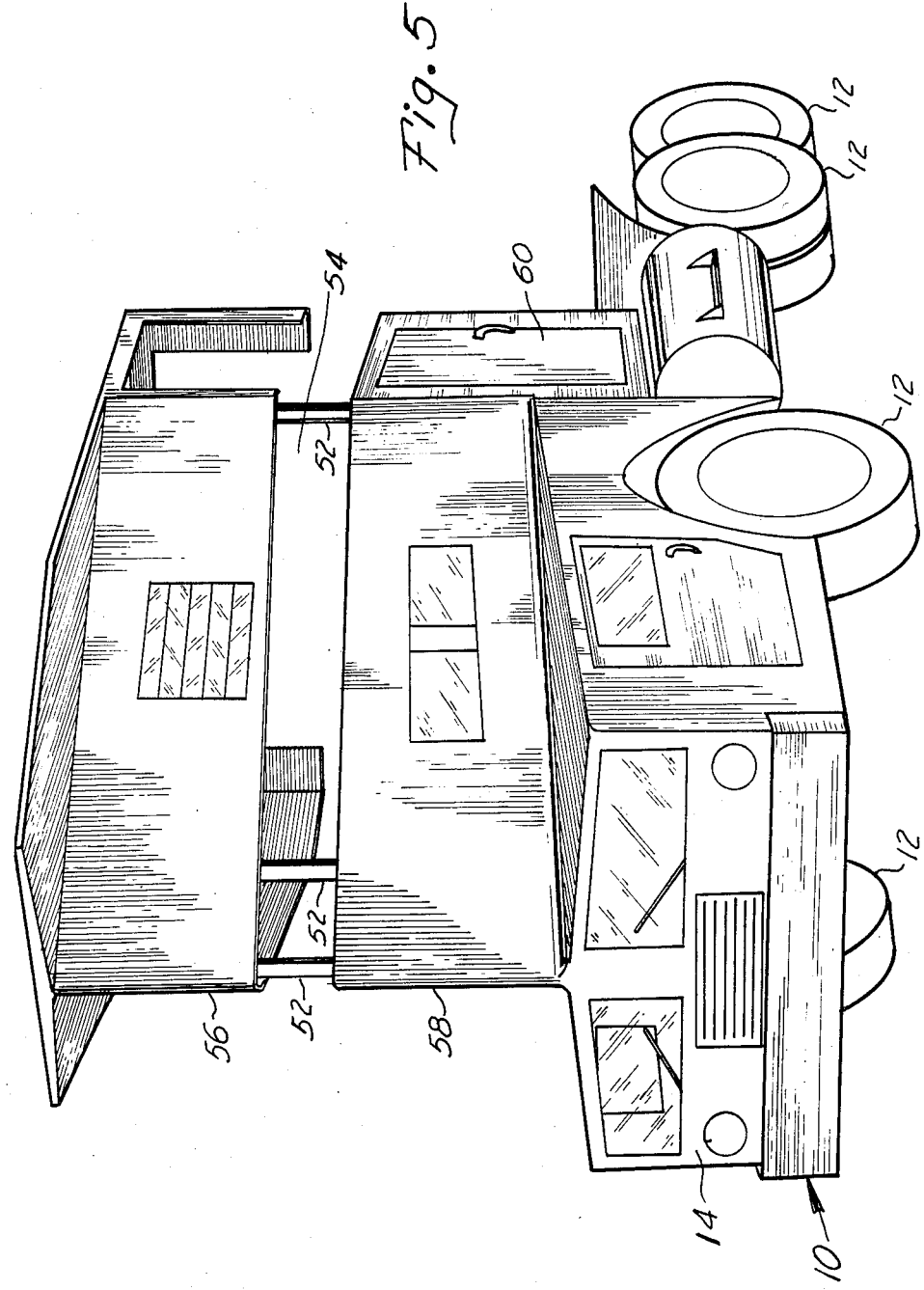

ENERGY-SAVING AERODYNAMIC VEHICLE

BACKGROUND OF THE INVENTION

1. Field of the Invention

The present invention relates generally to an energy-saving aerodynamic vehicle. More particularly, the invention relates to a vehicle having a structure which causes the fluid (gaseous;liquid) through which the vehicle moves to flow along the sides of the vehicle, and to minimize the flow of such fluid over the top of such vehicle.

The term "vehicle" as used herein is intended to include all types of vehicles which move on land, sea, air, amphibious type, and any other type of vehicle which moves through a fluid medium.

2. Description of Relevant Art

The prior art is replete with all types of attachments for vehicles which are intended to reduce air drag of the vehicle during movement. Such prior art is exemplified by the following:

Weems U.S. Pat. No. 452,741;
Adams U.S. Pat. No. 490,057;
Taylor U.S. Pat. No. 3,451,499;
Edwards U.S. Pat. No. 3,797,879;
U.S. Pat. No. 3,815,948;
Hobbensiefken U.S. Pat. No. 3,929,202;
Servala et al U.S. Pat. No. 3,945,677;
Ensor U.S. Pat. No. 4,095,835;
Greene et al U.S. Pat. No. 4,206,715;
Canning U.S. Pat. No. 4,210,354;
Stone U.S. Pat. No. 4,221,423;
Goize U.S. Pat. No. 4,239,253;
Keedy U.S. Pat. No. 4,257,641;
U.S. Pat. No. 4,269,443;
U.S. Pat. No. 4,269,444;
Front U.S. Pat. No. 4,313,635; and
Alford U.S. Pat. No. 4,355,834.

The prior art attempts to reduce air resistance and air drag and for streamlining the vehicle are, for the most part, complicated, uneconomical, unsightly and/or impractical.

The present invention effectively overcomes the foregoing problems and disadvantages attendant conventional techniques.

SUMMARY OF THE INVENTION

The present invention provides an energy-saving vehicle, comprising a vehicle which includes a first aerodynamic means for urging the fluid through which the vehicle moves to flow only along the sides of the vehicle, and for minimizing the flow of such fluid over the top of the vehicle and under the vehicle.

The energy-saving vehicle also includes an enclosure for a driver of the vehicle. The first aerodynamic means has its forward most portion positioned at or forwardly of the forward most portion of the enclosure for the driver of the vehicle.

It is an object of the present invention to provide an improved aerodynamic shape and means of producing commercial trucks and campers with reduced aerodynamic drag coefficients.

Another object of the present invention is to split the air flow by a vertical edge in order to divide the air flow horizontally and thus reduce the force to approximately ½ the force necessary to displace the air flow vertically.

It is another object of the present invention to provide energy-saving vehicles which would, based on a million vehicle truck fleet, save billions of gallons of fuel per year.

The above and further objects, features and advantages of the present invention will become apparent from the following detailed description of preferred embodiments of the invention, when read in conjunction with the accompanying drawings.

BRIEF DESCRIPTION OF THE DRAWINGS

FIG. 5 depicts a perspective view of a fifth embodiment of the invention.

DETAILED DESCRIPTION OF PREFERRED EMBODIMENTS

Figure 1:
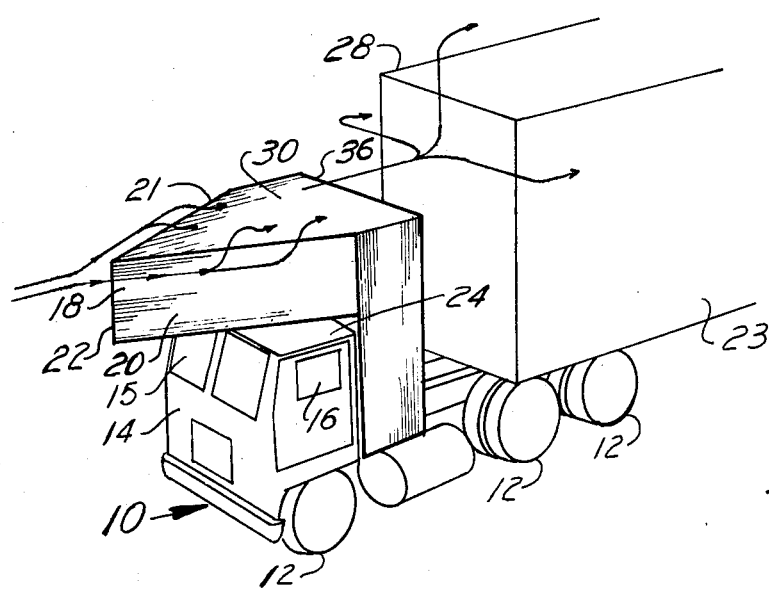
FIG. 1 depicts a perspective view of a first embodiment of the invention.

With reference to FIG. 1, there is shown a vehicle 10. The vehicle 10 includes wheels 12, a cab or driver enclosure 14 having a windshield 15 and side windows 16, to enable a driver in the cab 14 to view both the exterior of the vehicle 10 and path of travel of the vehicle 10 while steering said vehicle 10.

The vehicle 10 includes a canopy 18 which is wedge shaped. The canopy 18 has a first canopy side 20 and second canopy side 21 which converge to form a canopy edge 22 forward of the driver enclosure 14. The canopy 18 overhangs the driver enclosure roof 24 with the vertical canopy edge 22 preferably lying forwards of the cab 14 and along an imaginary line which preferably bisects the front end of the cab encosure 14.

The vehicle 10 may also include a trailer 28, which trails behind and is higher than the cab 14.

The vehicle 10 moves on wheels 12 through a fluid medium such as air. The canopy edge 22 serves to urge the fluid medium primarily along the sides 23 of the vehicle. However, a substantial portion of air can still flow over the top of the canopy 30. This overflow can result in turbulence at the top 30 which is generally undesirable because turbulence results in drag. To the extent, however, that the air is urged primarily along the sides of the canopy 20 and 21, turbulence is decreased, and so is drag.

The rear of the canopy 36 should be wide so the canopy 18 directs air towards the vehicle sides. Generally the rear of the canopy 36 need be no wider than the width of the trailer front, and the canopy rear can be narrower.

Figure 2:
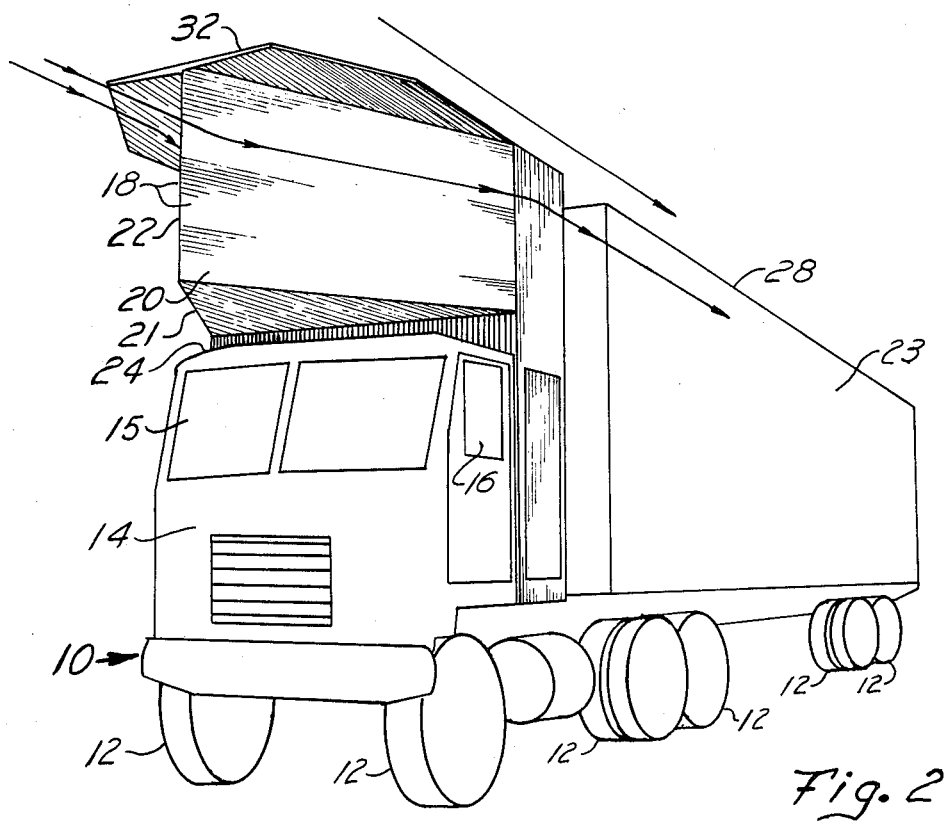
FIG. 2 depicts a perspective view of a second embodiment of the invention.

The vehicle 10 depicted in FIG. 2 differs from the vehicle 10 in FIG. 1 by the addition of a visor 32 which is attached to, rests on, and extends over and beyond canopy sides 20 and 21.

Drag forces are generated at least partly by low-pressure, vacuum conditions on localized vehicle surfaces as moving air particles separate from the vehicle surface. In conventional vehicles, air separation effects occur at the grill-hood intersection, and also at the windshield-roof intersection. The air moving relative to the vehicle is not able to closely follow directional changes in the vehicle surface; consequently the air tends to separate from the vehicle surface, creating vacuum forces that exert drag effects on the vehicle.

Although other theories may be applicable, I hypothesize that visor 32 prevents air on windshield 15 from flowing upwardly over visor 32; consequently there is no air separation effect or resultant drag force. The air that would otherwise flow upwardly over cab roof 24, visor 32, or trailer top 28 is instead deflected laterally with the air flowing naturally from the vehicle front to vehicle side surfaces 23.

The enhanced air flow along the vehicle side surfaces due to the forward roof extension or visor 32 provides a more uniform air flow, thereby minimizing air separation effects on the vehicle side surfaces 23.

Figure 3:
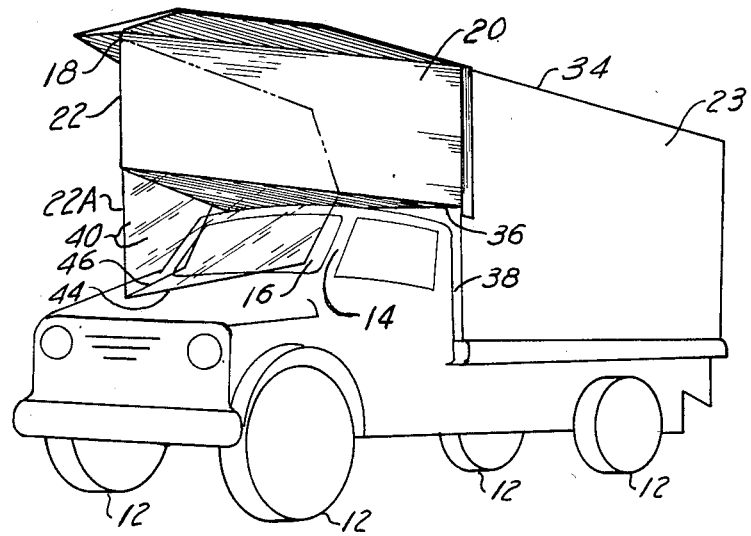
FIG. 3 depicts a perspective view of a third embodiment of the invention.

The FIG. 3 vehicle has a rear cargo section 34. The rear wall 36 of the canopy is attached to the front wall 38 of the cargo section 34.

A vertical, transparent extension 40 of the canopy 18 may descend to the hood 42 of the vehicle to further promote lateral air movement along the vehicle's sides 23 and to further deter the creation of turbulent air flow about the vehicle.

The extension is a transparent material such as plexiglass. A first wall 44 of the extension serves as a continuation of first canopy side 20 and second extension wall 46 serves as a continuation of second canopy side 21. The edge 22A formed by the convergence of first extension wall 44 and second extension wall 46 serves as a continuation of canopy edge 22.

First extension wall 44 may be hinged to first canopy side 20 and second extension wall 46 may be hinged to second canopy side 21. By rotation of first wall 44 and second wall 46 about their respective hinges, the extension 40 may be dropped into place in ront of windshield 16 of cab 14. Conversely, by rotation in the opposite direction, said first wall 44 and said second wall 46 may be raised above cab 14 and secured to canopy 18.

Figure 4:
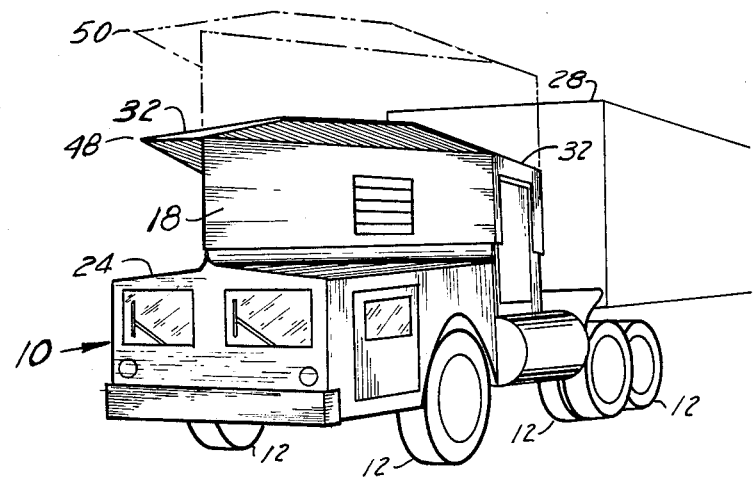
FIG. 4 depicts a perspective view of a fourth embodiment of the invention.

The vehicle 10 of FIG. 4 has a canopy 18 on cab roof 24. The absence of a gap between the canopy 18 and the cab roof 24 serves to facilitate the reduction of drag caused by air turbulence. The canopy 18 may be extended from a first position 48 to a fully extended position 50 or to any intermediate position. Preferably the visor 32 height may be placed at the same height as, or lower than trailer top 28 to minimize turbulence at the trailer top 28.

As depicted in FIG. 5, the extension is accomplished utilizing poles 52 which can telescope in an upward or downward direction. Any gaps 54 created by extending the canopy 18 in an upward direction may be filled utilizing a removable cover (not shown). Alternatively, the upward portion of the canopy 56 may overlap the lower portion of the canopy 58 so that no gaps are created as the upward portion of the canopy 56 moves either up or down.

The telescoping feature allows the canopy 18 to be extended or contracted to accommodate trailers of varying height and size, and to allow adjustment for different wind conditions.

Canopy 18 may also serve as a storage enclosure. A wall 58 of the canopy may have a door 60 provided therein for accessing the enclosure.

Figure 6:
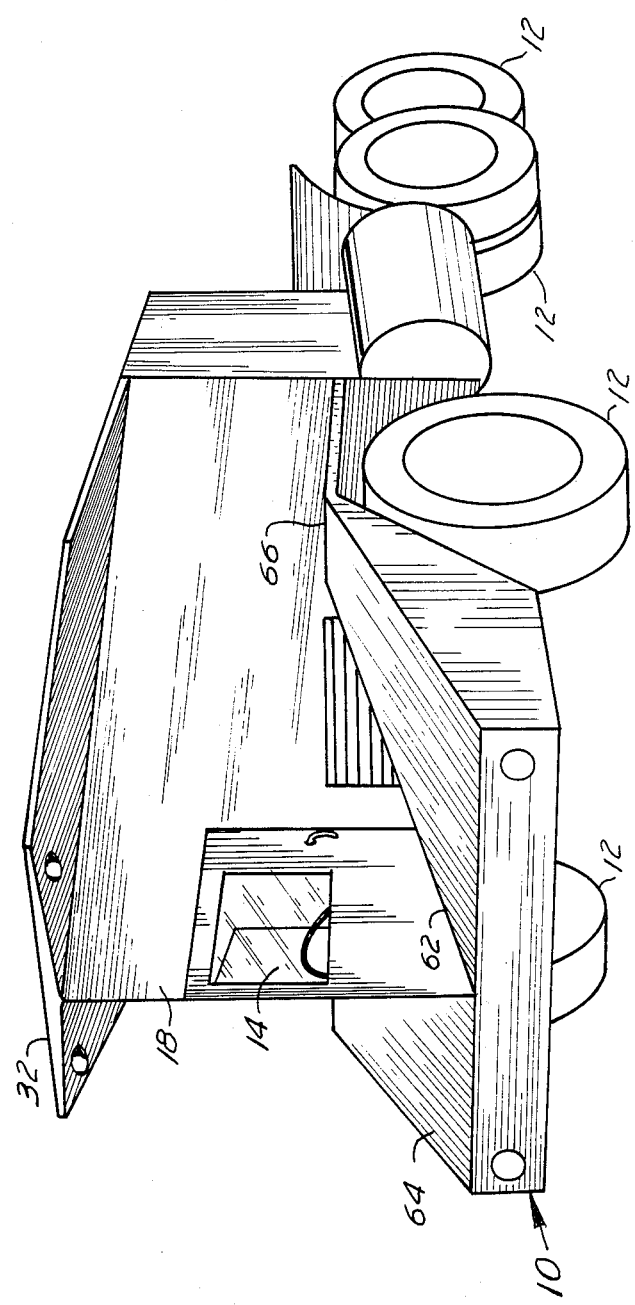
FIG. 6 depicts a perspective view of a sixth embodiment of the invention.

In FIG. 6, the embodiment depicted in the canopy 18 includes driver enclosure 14. There is no gap between driver enclosure 14 and canopy 18 thus, air turbulence is reduced. Additionally, base 62 of the canopy slopes in a downward, forward direction. Fenders 64 are flat surfaces which rise upwardly from the forward most area of the vehicle to a plateau 66 contiguous with and perpendicular to canopy side walls. Air turbulence is reduced because there is no grill-hood interface or canopy-cab section gap with this design.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

What is claimed is:

1. An energy-saving vehicle, comprising:
   a vehicle including a first aerodynamic means for urging the fluid through which the vehicle moves to flow along the sides of said vehicle;
   said vehicle including an enclosure for a driver of said vehicle;
   said first aerodynamic means having a forward most portion positioned forward of the forward most portion of said enclosure for said driver of said vehicle;
   said first aerodynamic means having a rearward most portion posterior to the rearward most portion of said enclosure for a driver;
   the forward most portion of said first aerodynamic means includes a vertical wedge having a first wall and a second wall converging towards the front end of the vehicle to a vertical edge positioned forward of the forward most position of said driver enclosure;
   said first aerodynamic includes a visor, said visor spanning and extending exteriorly of said converging walls whereby said fluid is urged to flow only along the sides of said vehicle, and flow of said fluid over the top of said vehicle and under said vehicle is minimized; and
   said first aerodynamic means defines an enclosed space.

2. The vehicle of claim 1, wherein said visor is essentially horizontal, and is placed at the same height as the trailer top to minimize turbulence at said trailer top.

3. The vehicle of claim 2, wherein the first wall and the second wall each has an upper and lower section.

4. The vehicle of claim 3, further comprising:
   a means for vertically separating the upper and lower section in the first wall and in the second wall.

5. The vehicle of claim 4, wherein the wall separating means include a set of spaced apart vertically telescoping posts.

6. The vehicle of claim 5, further comprising means for filling the gap created between the upper and lower wall sections of a first wall and the gap created between the upper and lower sections of the second wall when the walls are expanded.

7. The vehicle of claim 6, wherein said gap filling means include an insertible panel.

8. The vehicle of claim 5, further comprising:
   a lower extension for said first aerodynamic means.

9. An energy-saving vehicle, comprising:
   a vehicle including a first aerodynamic means for urging the fluid through which the vehicle moves to flow along the sides of said vehicle;
   said vehicle including an enclosure for a driver of said vehicle;

said first aerodynamic means having a forward most portion positioned forward of the forward most portion of said enclosure for said driver of said vehicle;

said first aerodynamic means having a rearward most portion posterior to the rearward most portion of said enclosure for a driver;

the forward most portion of said first aerodynamic means includes a vertical wedge having a first wall and a second wall converging towards the front end of the vehicle to a vertical edge positioned forward of the forward most position of said driver enclosure;

said first aerodynamic includes a visor, said visor spanning and extending exteriorly of said converging walls whereby said fluid is urged to flow only along the sides of said vehicle, and flow of said fluid over the top of said vehicle and under said vehicle is minimized;

a vertical wall of said first aerodynamic means has a door large enough to accommodate said driver; and said first aerodynamic means defines an enclosed space accessible by the door.

10. The method of making the vehicle of claim 1, comprising the steps of:

(a) making an enclosed vertical wedge, said wedge having a first side and a second side converging at a forward position;

(b) placing said vertical wedge on top of a motor vehicle, said forward most portion of the wedge lying forward of the forward most portion of the driver compartment of the motor vehicle, and the rearward most portion of the wedge lying behind the rearward most portion of the driver compartment of a motor vehicle; and (c) attaching a visor to an upper portion of said vertical wedge such that said visor spans and extends exteriorly of said converging sides, whereby a fluid through which said vehicle moves will be urged only along the sides of said vehicle, and flow of said fluid over the top of said vehicle and beneath said vehicle is minimized.

* * * * *